United States Patent [19]

Fincher et al.

[11] Patent Number: 4,748,393

[45] Date of Patent: May 31, 1988

[54] POSITIVE FEEDBACK POSITION SERVO

[75] Inventors: Jeffrey L. Fincher, San Bruno; Lauren V. Merritt, Sunnyvale; Gordon D. Svendsen, Belmont, all of Calif.

[73] Assignee: Ampex Corporation, Redwood City, Calif.

[21] Appl. No.: 10,652

[22] Filed: Feb. 4, 1987

[51] Int. Cl.[4] .............................................. G05B 1/06
[52] U.S. Cl. ..................................... 318/638; 318/646; 318/648; 318/628; 360/78
[58] Field of Search ............... 318/638, 646, 648, 328; 360/78

[56] References Cited

U.S. PATENT DOCUMENTS 3,967,178 6/1976 Morris ................................. 318/648
4,566,046 1/1986 Fujiki et al. ............................ 360/78

Primary Examiner—William M. Shoop, Jr.
Assistant Examiner—Saul M. Bergmann
Attorney, Agent, or Firm—Elizabeth E. Strnad; Richard P. Lange

[57] ABSTRACT

A position servo system is described for positioning a member mounted on a spring. The spring provides a force opposing the motion of the member from an initial position. A position actuator, for example a motor, applies a force in response to a position request signal for moving the member to a desired position. A portion of the position feedback signal is applied from a position sensor to the motor as a positive feedback signal to compensate for the force of the spring. A steady state position error of the servo system is thereby substantially reduced to zero. A circuit and method for calibrating the positive feedback signal are also described.

28 Claims, 9 Drawing Sheets

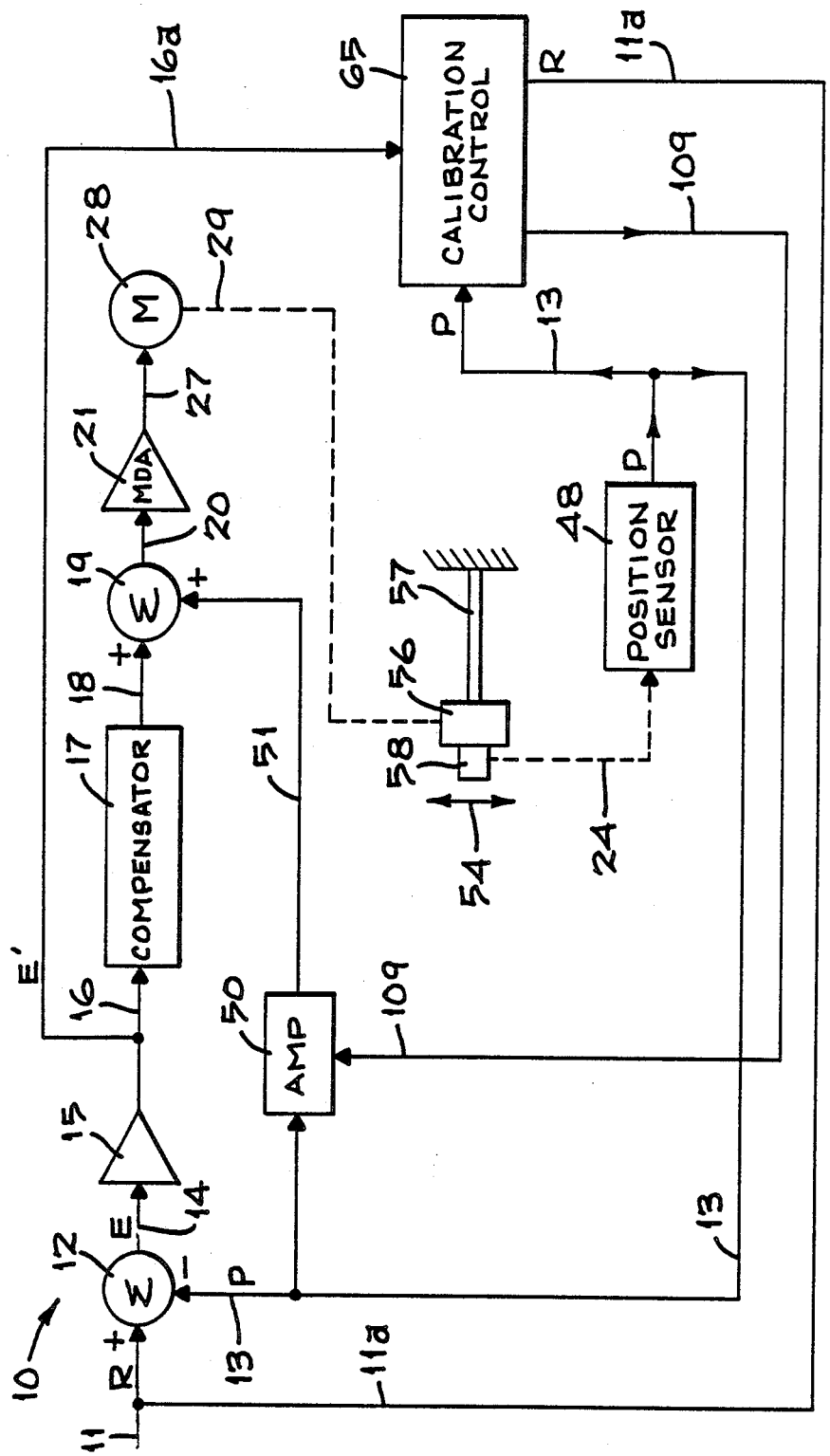
FIG_1

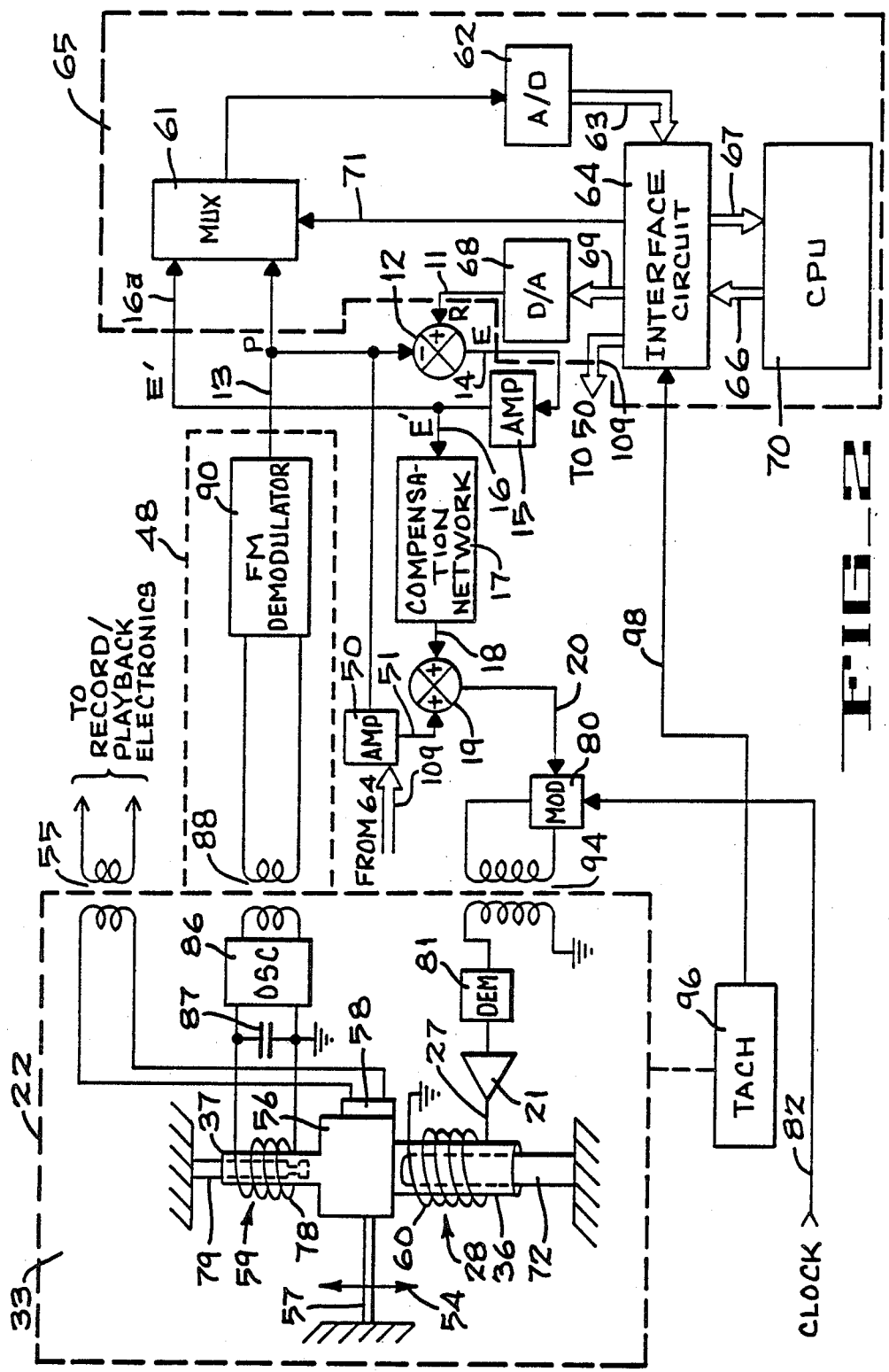
FIG_2

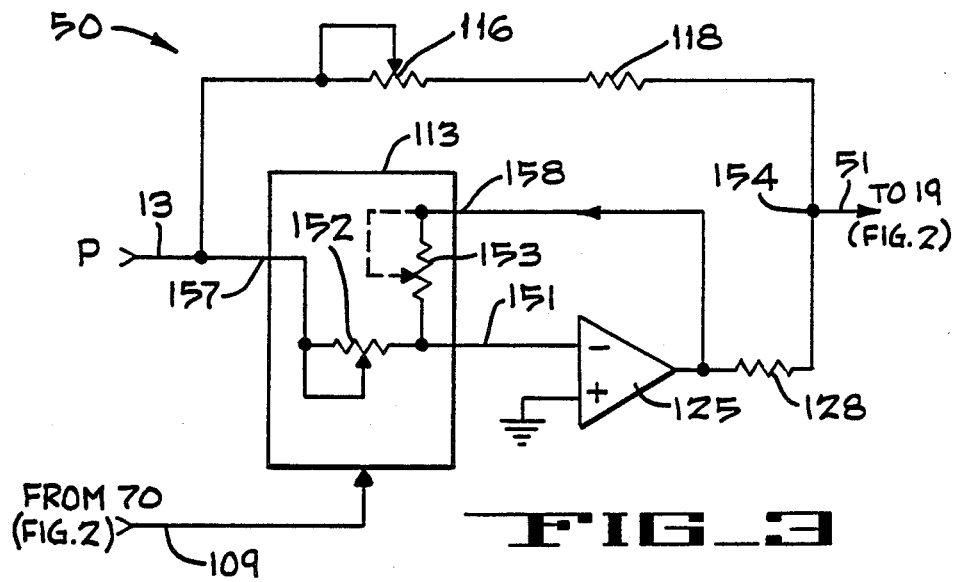
FIG_3
(A)
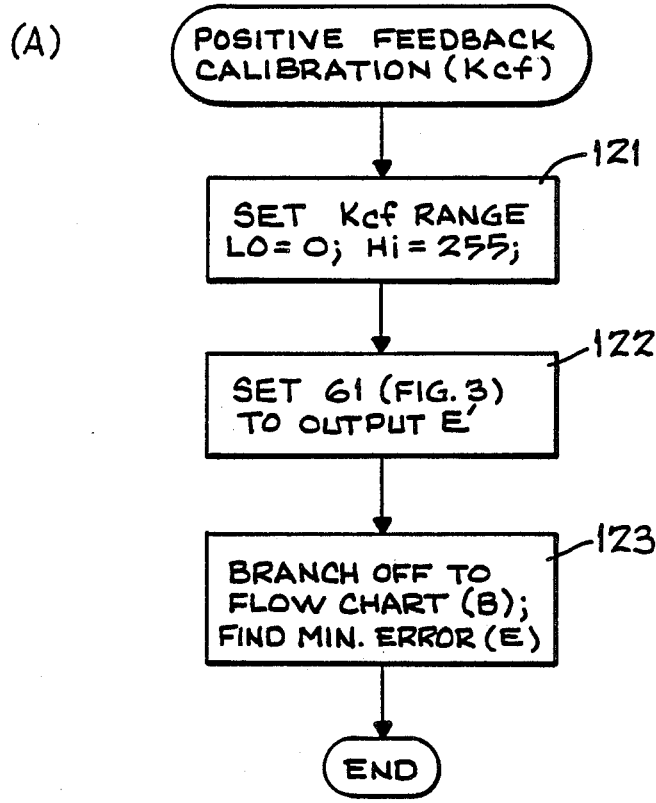
FIG_6A

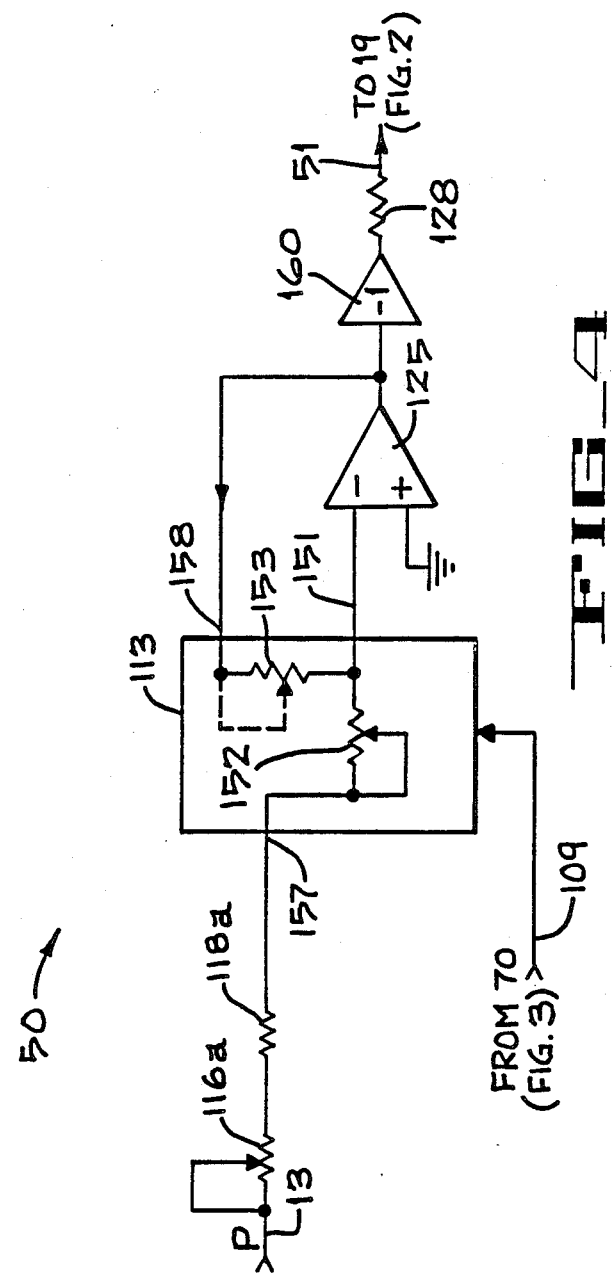
FIG_4

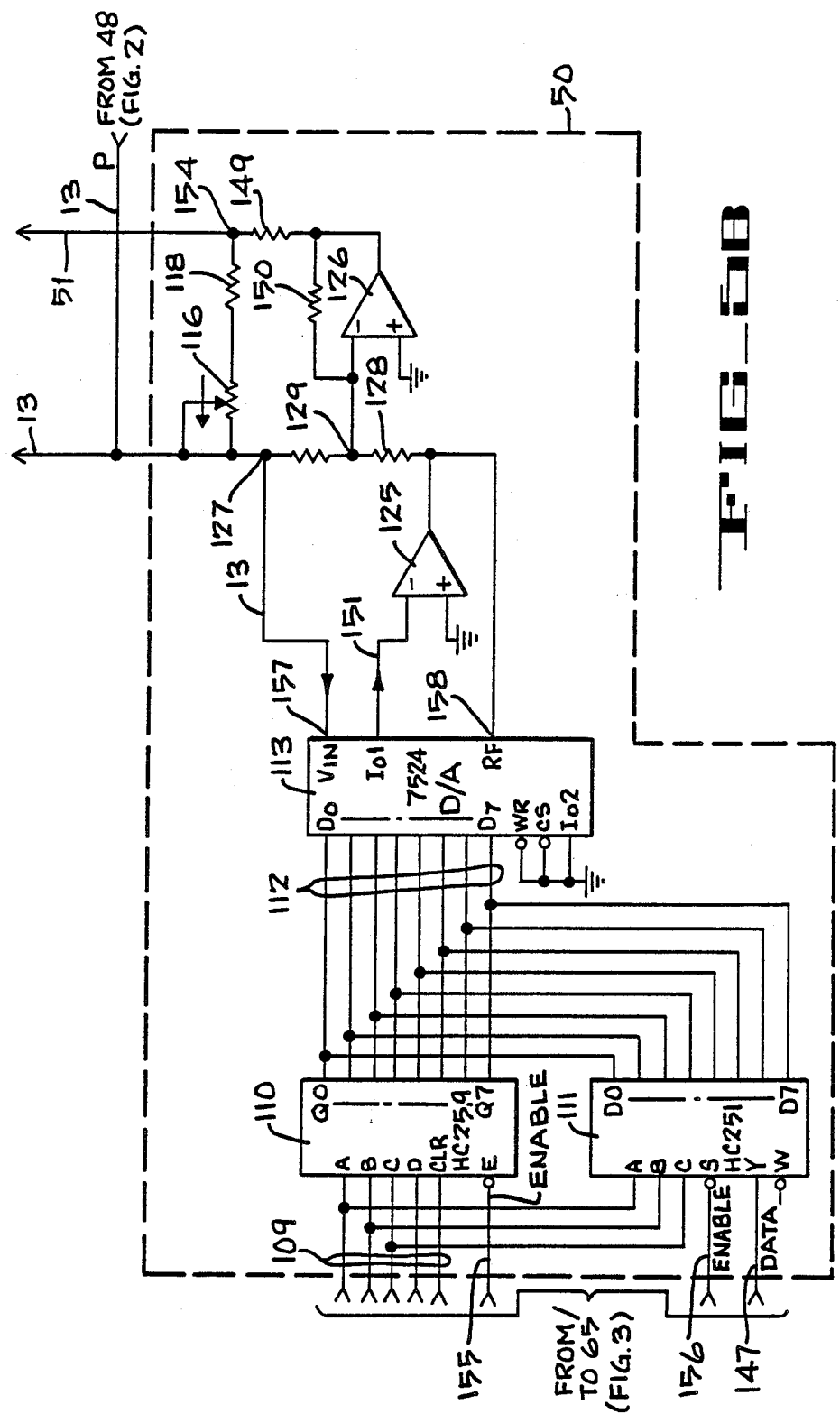

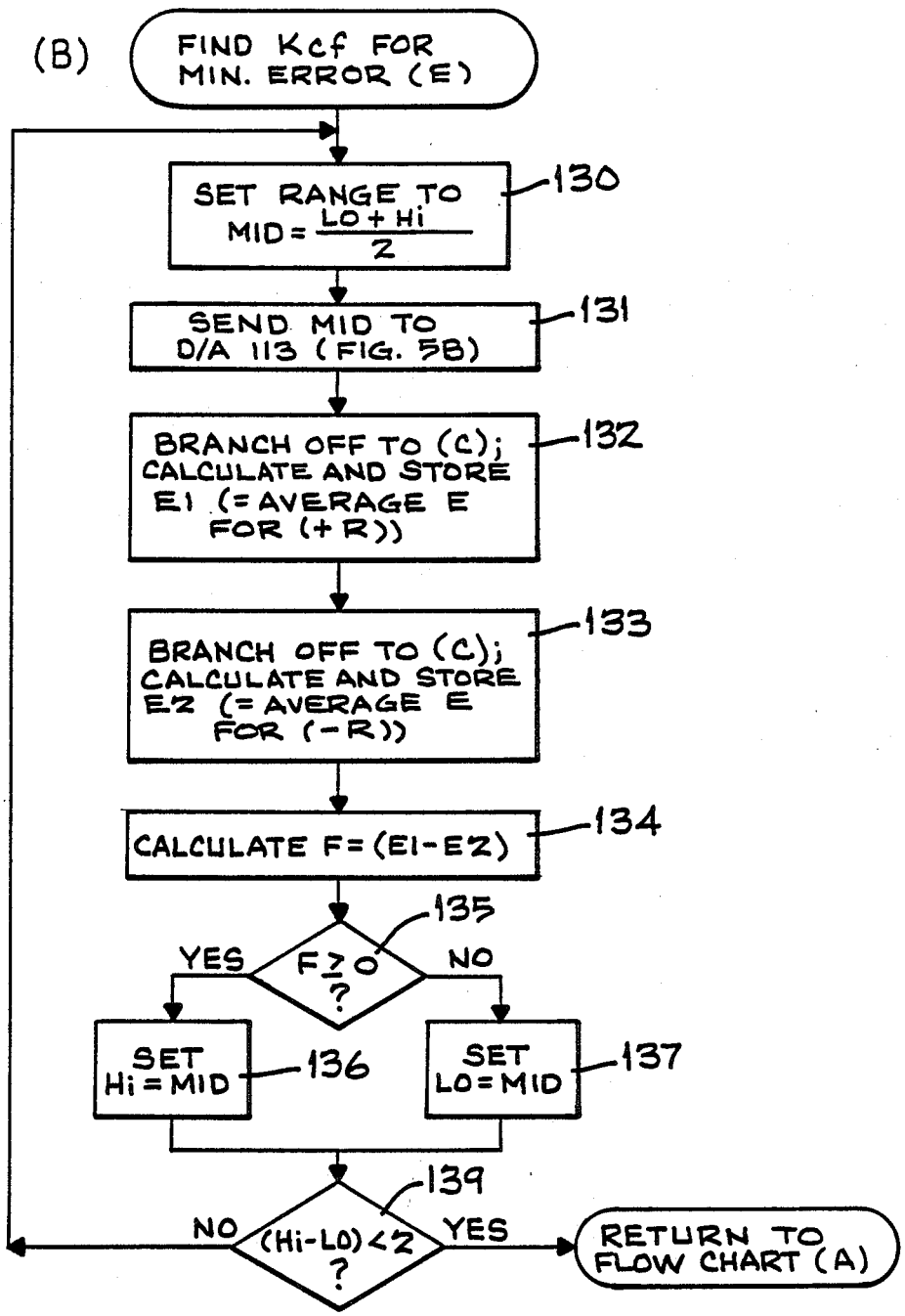
FIG_6B

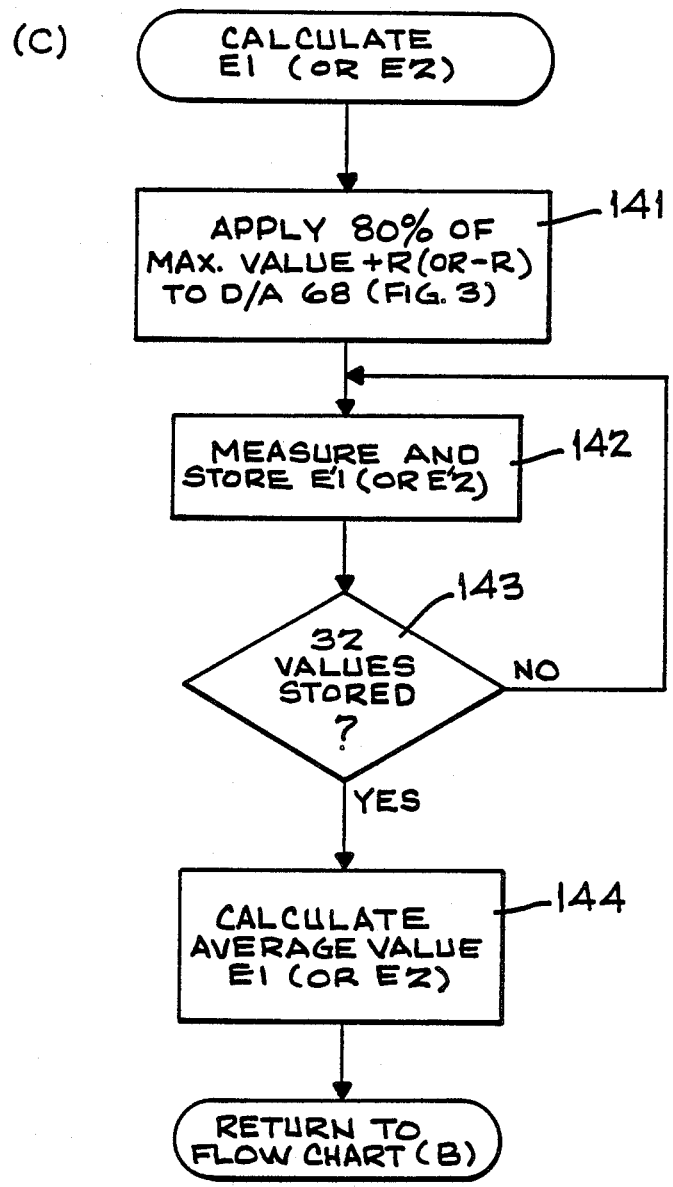
FIG_6C

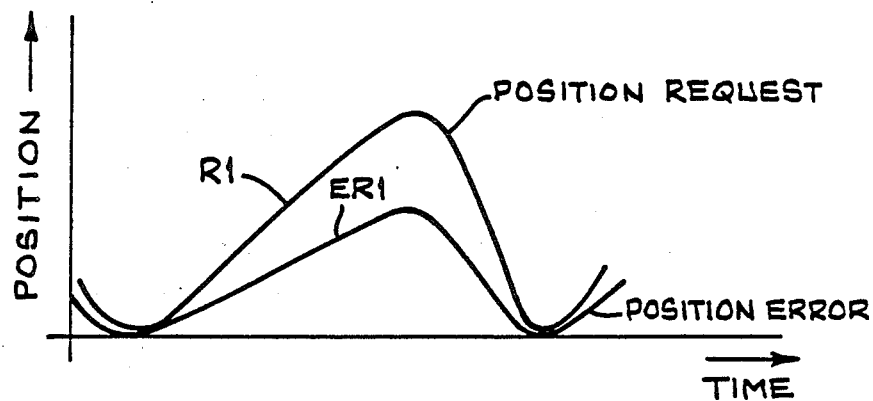
FIG_7A
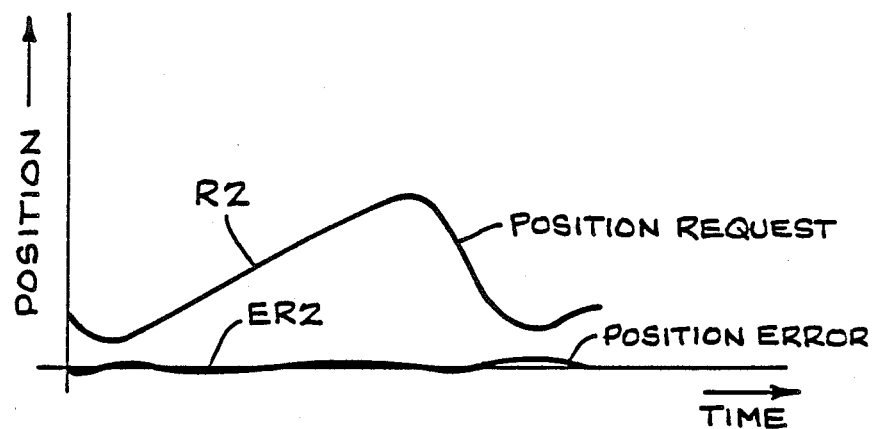
FIG_7B

POSITIVE FEEDBACK POSITION SERVO

The invention described herein was made in the course of Contract No. 10446-78 awarded by the U.S. Government.

This invention relates in general to position servo systems and more particularly to such systems for positioning a moveable member mounted on a spring.

BACKGROUND OF THE INVENTION

Position servo systems are known to be utilized for accurate positioning of a moveable member in response to a position request signal. These systems generally include an actuator for providing a force to move the member to a desired position, as well as a position transducer for determining the actual position of the moveable member. Known position transducers include for example potentiometers, variable inductances or capacitances, resolvers, magnetic or optical encoders, differential transformers and others. An error signal is determined as a difference between the position request and actual position signals and is applied through appropriate circuitry to a servo motor whose moveable portion is attached to the member. In applications with strict requirements related to positioning accuracy it is desirable to reduce the steady state position error to minimum and ideally to zero.

It is generally known to mount the moveable member on a spring providing a force opposing the motion of the member from an initial position. Voice coil motors, such as voice coil type audio frequency speakers, are an example of known actuators. These actuators require a small amount of position error to overcome the force of the spring while keeping it deflected in the desired position. This introduces a steady state position error into the servo loop. Efforts to reduce the error by increasing the loop gain have limited success because of the need to avoid exciting system resonances. While it is possible to compensate for the opposing force of the spring by integrating the error signal, this method introduces a phase lag into the feedback loop, thereby increasing servo instability and complicating the stabilization requirements.

An example of a known servo system for positioning a moveable magnetic transducer utilized in a magnetic recording/reproducing device is described, for example in the U.S. Pat. No. 4,485,414. An example of a leaf spring assembly for holding and varying the position of a magnetic transducer is described in U.S. Pat. No. 4,212,043. Both above-indicated patents are assigned to the assignee of this patent application.

SUMMARY OF THE INVENTION

The present invention overcomes the aboveindicated disadvantages of known position servo systems as it will be described below.

In accordance with the invention a position servo system is provided having a positive feedback loop which applies a portion of the position feedback signal from the output of the position sensor to the actuator. That feedback signal is adjusted to compensate for the force provided by the actuator which is necessary to overcome the opposing spring force. The resulting steady state position error signal which is obtained as a difference between the position request and position feedback signals is reduced to a minimum and ideally to zero. The position accuracy of the servo is thereby significantly improved.

It is a significant advantage of the invention that the adjustment of the positive feedback signal is not dependent on the servo loop gain. The accuracy of the adjustment is limited only by the resolution obtainable by the particular circuit elements utilized.

As a further advantage of the invention, to adjust the positive feedback signal, a calibration process is utilized which automatically compensates for variations in the various servo components due to manufacturing tolerances, aging, environmental changes and other effects.

In the preferred embodiment a variable gain amplifier circuit is utilized to obtain coarse and fine calibration of the positive feedback signal to compensate for the spring force. The coarse calibration is provided for example by means of a variable resistor coupled in parallel or in series with the amplifier. To obtain a coarse adjustment of the positive feedback voltage the variable resistor is adjusted to obtain a minimum steady state position error. To obtain automatic fine adjustment, the amplifier gain is preferably adjusted by changing input resistor values, utilizing a microprocessor and a multiplying digital-to-analog converter coupled to the amplifier input. During the adjustment process the microprocessor generates a request signal requesting midscale deflections of the spring by the actuator in opposite directions, and the magnitude of the error signal in each direction is monitored. The variable resistor is adjusted such that the difference between error signals obtained in each direction is at a minimum. The foregoing process of deflecting the spring in opposite directions and monitoring the error signal is then repeated for the fine calibration process. However, in this case the error signal is measured by the microprocessor and the positive feedback is adjusted by the multiplying digital-to-analog (D/A) converter until a near zero position error signal is obtained in both directions of deflection. A zero position error signal indicates that the spring force is precisely compensated for by the positive feedback signal. The calibration process is thereby accomplished.

BRIEF DESCRIPTION OF THE DRAWINGS

FIG. 1 is a simplified block diagram of a position servo system in accordance with the preferred embodiment of the invention.

FIG. 2 is a more detailed block diagram of a servo system shown in FIG. 1, for positioning a magnetic transducer assembly in accordance with the preferred embodiment of the invention.

FIG. 3 is a circuit diagram of the positive feedback path utilized in the system of FIG. 2.

FIG. 4 is an alternative embodiment to the circuit of FIG. 3.

FIGS. 5A and 5B are consecutive portions of a detailed circuit diagram corresponding to a portion of FIG. 2.

FIGS. 6A to 6C show respective flow charts depicting a positive feedback calibration process in accordance with the operation of the preferred embodiment.

FIG. 7A is a timing diagram of a position error signal obtained in a position servo system which does not include compensation for the spring force.

FIG. 7B is a timing diagram of a position error signal obtained in accordance with the invention.

DETAILED DESCRIPTION

Figure 5A:
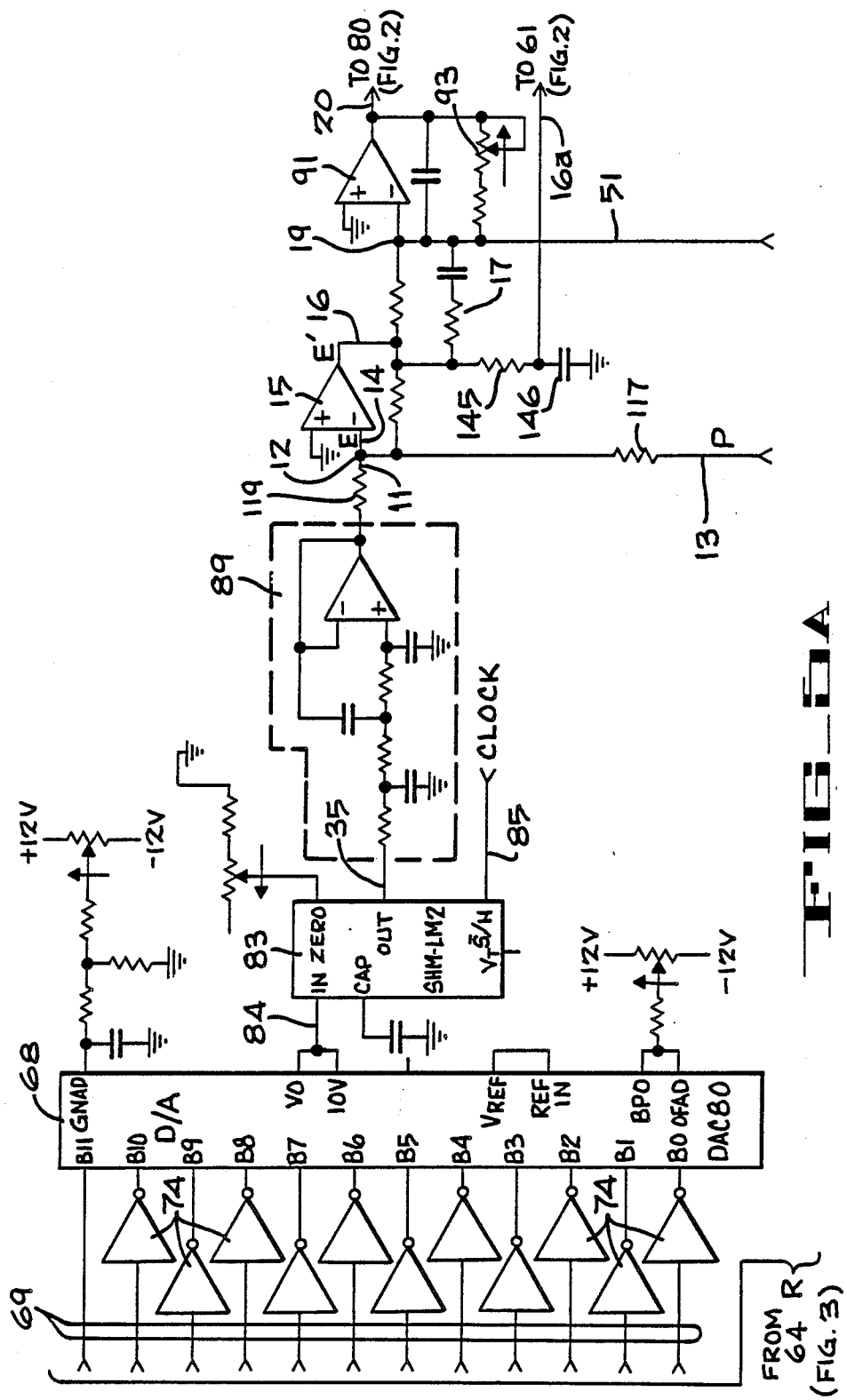

It is noted that like reference numerals are utilized to designate like circuit elements in all the drawing figures to facilitate comparison.

FIG. 1 shows a simplified block diagram of the preferred embodiment of a position servo circuit in accordance with the invention. That circuit is utilized for accurate positioning of a magnetic transducer mounted on a leaf spring type mounting element, for recording or reproducing information signals along a desired track of a recording medium (not shown).

With further reference to FIG. 1, a position request signal R is applied on line 11 to one input of a first summing junction 12 whose other input receives a negative feedback position signal P via line 13. As is well known from position servo theory, the signal on line 11 represents a desired position to be assumed by a positionable member, for example a magnetic transducer, while the signal on line 13 represents the actual position assumed by that member. At junction 12 the signal on line 13 is subtracted from the signal on line 11 and the thusly obtained difference signal on line 14 represents a position error signal E. The position error signal is in the form of a voltage which is amplified by a voltage amplifier 15. The amplified voltage is applied via line 16 to a compensator 17 which provides frequency compensation to eliminate instability at the loop gain crossover frequency, as it is well known in the art. The output signal from the compensator 17 is applied via line 18 to a motor drive amplifier, (thereafter "MDA") 21. The MDA 21 is utilized to apply via line 27 a current to drive a motor 28 in response to a voltage applied thereto on line 20.

A positionable member 58 is mounted on a moveable mount 56. The mount 56 is mechanically attached to one end of a spring 57, preferrably a leaf spring. The other end of the leaf spring is fixedly attached to a reference surface. The motor 28 applies a force via line 29, shown as an interrupted line, to the moveable mount 56, thereby forcing the member 58 to move in the direction of arrow 54. The leaf spring 57 provides a force opposing the motion of the member 58 from an initial position. Consequently, the motor would have to apply additional force, to overcome the force of the spring, in addition to the force necessary to move the member to a desired position in response to the position request.

That additional force provided by the motor introduces an undesirable steady state position error in known servo systems. The present invention eliminates that steady state error as will be more apparent from further description.

With further reference to FIG. 1, the position of member 58 is detected via line 24, shown by interrupted line, by a position sensor 48. The position sensor 48 detects the actual position of the positionable member 58 and converts it to a position signal P. The signal P from the position sensor 48 is applied via line 13 to the second input of the summing junction 12 as a negative feedback voltage, as it has been described previously.

In accordance with the preferred embodiment of FIG. 1 the above-indicated steady state error is eliminated from the position servo system of the invention as follows. A portion of the position signal P at the output of the position sensor 48 on line 13 is fed back via a variable gain amplifier circuit 50 and line 51 to a summing junction 19 where it is added to the signal at the output of the compensator 17 as a positive feedback signal. In the context of this specification by "positive feedback signal" it is understood that a portion of the position signal P is added with a positive sign to the drive signal of the motor. The magnitude of that positive feedback signal on line 51 is calibrated to accurately correspond to the force which has to be applied by the motor to overcome the force of the spring. To obtain the foregoing, a calibration control circuit 65 is shown as receiving via line 16a an amplified error signal E' from amplifier 15 and via line 13 a position signal P from the position sensor 48. The calibration control circuit 65 generates a request signal R for calibration purposes and applies that signal R via line 11a to the first summing circuit 12. Alternatively, the request signal R may be generated outside the circuit of FIG. 1 and applied via line 11 to summing circuit 12. In that case it is also applied via line 11a to the calibration control circuit 65 so that it may properly adjust its output signal on line 109 to obtain a desired gain adjustment of amplifier circuit 50. The preferred calibration method and circuit will be described later in detail.

Reference is now made to FIG. 2 showing a more detailed block diagram of a position servo system in accordance with the preferred embodiment of the invention. The position servo system of FIG. 2 is utilized in a helical scan magnetic recording/reproducing device.

In FIG. 2 those elements of the circuit which are mounted on the rotating drum portion 33 of the device are enclosed within dashed lines 22. A linear motion motor, implemented as a voice coil motor 28 is shown as having a moveable portion 36 mechanically coupled to a moveable mount 56 on which a magnetic transducer assembly 58 is mounted. The moveable mount 56 is mounted on one end of a leaf spring 57 whose other end is fixedly attached to a reference surface. In this example the reference surface is provided by the rotating drum portion 33. The voice coil motor 28 has a magnetic core 72 fixedly attached to the rotating drum portion 33 and a voice coil 60 which is wound around the moveable portion 36 surrounding the core 72 and moveable along the core. A position sensor 59 has a fixed portion 79 rigidly attached to the drum portion 33, and a moveable sensor coil 78 wound around a moveable portion 37 attached to the moveable mount 56. A position sensing circuit 48 including the sensor 59 and comprising oscillator 86, capacitor 87, rotary transformer 88 and FM demodulator 90 detects the actual position of the magnetic transducer 58 and generates an output signal P, as it will be described later in more detail.

The output signal P from the position sensing circuit 48 is coupled via line 13 to a multiplexer 61 and also to a negative input of a summing junction 12. Another, positive input of the summing junction 12 receives a position request signal R via line 11. The difference signal at the output 14 from the summing junction 12 corresponds to the previously described position error signal E of FIG. 1. The signal E is amplified by amplifier 15 and the amplified signal E' on line 16 is coupled to an input terminal of a conventional servo compensation network 17. The signal E' is also applied via line 16a to the multiplexer 61. The output of the compensation network 17 is coupled via line 18 to a second summing junction 19. A positive feedback signal is applied from the output of the position sensing circuit 48 via a variable gain feedback amplifier circuit 50 and line 51 to the summing junction 19. The gain of the amplifier circuit 50 is adjusted to compensate for the force necessary to be applied by the motor 28 to overcome the opposing force of the spring, as it will be described in more detail below.

The output of the summing junction 19 is coupled via line 20 to an input of an amplitude modulator 80 whose output is coupled to stationary windings of a rotary transformer 94. The modulator 80 receives via line 82 a carrier frequency clock signal, generated by a system clock generator (not shown) for example having a frequency in the order of tens of KHz. The carrier frequency signal is amplitude modulated in the modulator 80 by the signal on line 20. The modulated signal is induced in the rotating windings of the rotary transformer 94 and applied to amplitude demodulator 81 which operates synchronously with the modulator. The demodulator 81 removes the carrier frequency clock signal from the modulated signal and applies the resulting signal to the motor drive amplifier, MDA 21. The amplified signal from MDA 21 is applied via line 27 as a drive signal to the voice coil motor winding 60. The above described modulation and demodulation processes are well known in the art and therefore a more detailed description thereof is not provided.

The multiplexer 61 may also receive signals related to tracking a particular track on the recording medium, from circuit portions which are not relevant to the invention and therefore not shown. The output of the multiplexer 61 is coupled to an input of an analog-to-digital (A/D) converter 62 and the digital signal output of the converter is coupled via line 63 to an interface circuit 64. The interface circuit transmits digital signals between a central processing unit (CPU) 70 and the rest of the circuit of FIG. 2 as well known in the art. The CPU may typically comprise a microprocessor, type TMS9900 manufactured by Texas Instruments. It is understood that any other minicomputer or microprocessor of suitable capability may be utilized instead. It follows from the foregoing description that elements 61, 62, 64, 68 and 70 of FIG. 2 correspond to the calibration control circuit 65 of FIG. 1.

As it is well known in the art of servo systems utilized for positioning a moveable transducer assembly, for example described in the above-mentioned U.S. Pat. No. 4,485,414, during the recording or reproduction of data tracks the CPU 70 computes a series of binary numbers which determine the amount of deflection to be applied by the motor 28 to the moveable mount 56 attached to spring 57 and carrying the head assembly 58, as a function of various data and system parameters. Various information and control data to and from the interface circuit 64 is transmitted to the CPU by means of lines 66 and 67, respectively. Data from the interface circuit 64 is transmitted via line 69 to a digital-to-analog (D/A) converter 68. The output of D/A converter 68 is coupled via line 11 to a positive input of the first summing junction 12, as previously described. Another output of the interface circuit 64 is coupled via line 71 to a control input of the multiplexer 61 to select one of its input signals.

The D/A converter 68 translates the sequence of binary numbers into an analog signal which is then applied through the first summing junction 12, amplifier 15, compensation network 17, the second summing junction 19, modulator 80, rotary transformer 94, and demodulator 81 to the MDA 21. The MDA 21 amplifies the output signal from demodulator 81 and applies a resulting current through the windings 60 of the voice coil motor 28 to thereby effect the force necessary for the deflection of the leaf spring 57. The position sensing circuit 48 associated with the sensor 56 feeds back information representative of the position of the transducer 58 mounted on mount 56. That information is supplied to the CPU 70 via line 13, the multiplexer 61, A/D converter 62 and interface circuit 64.

An example of a position sensing circuit such as shown at 48 in FIG. 2 is described in the above-referenced U.S. Pat. No. 4,485,414. The position sensor 59 typically comprises a coil 78 mechanically coupled to the moveable mount 56. The coil 78 surrounds a magnetic core 79 which is rigidly attached to the rotating drum portion 33. The coil 78 is electrically coupled to input terminals of an oscillator 86. A capacitor 87 is coupled across these input terminals, one terminal being at ground potential. The output terminals of the oscillator 86 are coupled to one side of a rotating transformer 88. The oscillator may be typically implemented by an integrated circuit, for example type MC1648, manufactured by Motorola Semiconductor Corporation. The stationary windings of the transformer 88 are coupled to input terminals of a conventional FM demodulator 90. In operation, the oscillator 86 causes the tank circuit formed by the coil 78 and the capacitor 87 to oscillate at a frequency determined by the position of the core 79 within the coil 78. When the coil is moved to different positions along the core, the frequency of oscillation is changed. The FM demodulator provides an output voltage proportional to the frequency of oscillation. Thus the output voltage P on line 13 from the FM demodulator is indicative of the position of the magnetic transducer 58.

The signal to be recorded or played back by the magnetic transducer 58 is coupled via a rotary transformer 55 to record/playback electronic circuits (not shown) in a well known manner.

While in the preferred embodiment a linear motor is utilized to position the transducer assembly, the invention is not limited thereto. In other embodiments for example a rotary spring and a rotary motor may be utilized.

The speed of rotation of the rotating assembly enclosed within the dashed line 22 is detected by a tachometer 96 whose output signal is applied to the interface circuit 64 via line 98 to thereby provide synchronization signals for the operation of the A/D and D/A converters 62, 68 and other circuit elements, in a manner well known in the art and described for example in the above-referenced U.S. Pat. No. 4,485,414.

The preferred embodiment of the variable gain positive feedback amplifier circuit 50 of FIG. 2 will now be described in more detail with reference to FIG. 3. The position signal P on line 13 is applied to two parallel circuit branches as follows. The first branch represented by a variable resistor 116 in series with a resistor 118, is utilized for coarse adjustment of the output signal on line 51. The second parallel branch has coupled therein a variable gain inverting operational amplifier 125 having its gain adjusted by a calibration circuit 65 of FIGS. 1 and 2. The calibration circuit is preferably implemented by a microprocessor which controls a multiplying D/A converter 113. The D/A converter 113 receives at an input 157 the position feedback signal P from the position sensing circuit 48 shown in FIGS. 1 and 2. The D/A converter 113 also receives at another input 158 a feedback signal from the output of amplifier 125. As it is schematically shown in FIG. 3, the D/A converter 113 changes the input resistor values 152 of the operational amplifier 125 in accordance with control signals received on line 109 from the CPU 70 of FIG. 2. A fixed feedback resistor value 153 is provided by the D/A converter 113. Alternatively, it is possible to change also the values of the resistor 153 as it is shown by dashed line.

As it will be described with reference to the detailed circuit diagram shown in FIGS. 5A and 5B, the gain of the amplifier 125 is changed by switching the values of resistor 152 internally within the multiplying D/A converter 113. Thus the amplitude of the signal on line 13 is "multiplied" by the adjustable gain factor provided by the D/A converter 113. The thusly adjusted output signal from amplifier 125 is applied via a series resistor 128 and summed at a junction 154 with the coarsely adjusted signal from resistor 118 and applied via line 51 to the summing junction 19 of FIG. 2.

An alternative embodiment to the circuit of FIG. 3 is shown in FIG. 4. In FIG. 4 a series combination of a variable resistor 116a and a resistor 118a is coupled in series with the multiplying D/A converter 113 and amplifier 125. The coarse adjustment of the positive feedback signal may be obtained by adjusting the value of resistor 116a, and fine adjustment by setting the output signal value on line 151 from the converter 113, similarly as in the embodiment of FIG. 3. Inverter 160 is used to maintain the correct polarity of the output signal on line 51.

An example of the calibration process including coarse and fine calibration of the positive feedback signal will be described later.

FIGS. 5A and 5B show a detailed circuit diagram of a portion of the block diagram of FIG. 2 including the adjustable gain positive feedback amplifier circuit 50. With further reference to FIG. 5A, a position request signal R is received in digital form on lines 69 and applied via inverters 74 to digital-to-analog (D/A) converter 68. For the purpose of calibration, the signal R is provided by the CPU 70 shown in FIG. 2 and applied therefrom via line 66, interface circuit 64 and lines 69 to D/A converter 68. With further reference to FIG. 5A the D/A converter 68 converts the digital signal into a corresponding analog signal on line 84 in a well known manner and applies the thusly obtained analog signal to a sample and hold (S/H) circuit 83. The S/H circuit 83 also receives a system clock on line 85 and samples the input signal received on line 84 between transitions thereof at the clock signal frequency. The thusly sampled signal is applied as the request signal R in analog form via line 35, a low pass filter 89, which eliminates undesired high frequency signal components, and via a series resistor 119 to the first summing junction 12. Summing junction 12 also receives a position signal P from position sensing circuit 48 of FIG. 2 via line 13 and resistor 117. The resulting difference signal from summing junction 12 on line 14 corresponds to the error signal E of FIG. 2. The error signal E is amplified by amplifier 15. The thusly amplified error signal E' is filtered in a filter comprising a series combination of resistor 145 and capacitor 146 to eliminate noise, and the filtered signal is applied from a junction between the elements 145 and 146 via line 16a to the multiplexer 61 of FIG. 2. As it has been described before with reference to FIG. 2, the error signal E' is applied through the multiplexer 61, A/D converter 62 and interface circuit 64 to CPU 70 (not shown in FIGS. 5A, 5B). The CPU 70 determines and stores values of signal E' during the calibration process, as it will be described below with reference to flow charts of FIGS. 6A to 6C.

The amplified error signal E' from amplifier 15 on line 16 is applied to a conventional servo compensation network 17 as previously described with reference of FIG. 2 and the output signal therefrom is summed at the second summing junction 19 with an output signal on line 51 from the variable gain positive feedback amplifier circuit 50. The thusly summed signal from junction 19 is applied to an inverting input of an operational amplifier 91 and applied therefrom via line 92 to the previously described modulator 80 of FIG. 2. The amplifier 91 has an adjustable feedback resistor for servo gain adjustment.

With further reference to FIG. 5B, the variable gain positive feedback circuit 50 is implemented in a similar way as in the previously described FIG. 3 with the following differences. The circuit branch utilized for fine adjustment comprises an additional inverting operational amplifier 126 connected in tandem with amplifier 125. A feedback resistor 150 is connected to the inverting input and a series resistor 149 is connected to the output of amplifier 126. The non-inverting input of amplifier 126 is grounded. Resistors 118 and 149 are connected at a junction 154 where the signals from the fine and coarse adjustment branches are summed, to provide an adjusted output signal on line 51.

As it has been previously described with reference to FIG. 2, the output signal on line 51 from circuit 50 represents a portion of the position signal P on line 13 and it is calibrated to have a magnitude corresponding to a force applied by the motor 28 to compensate for the opposing force of the spring 57.

With further reference to circuit 50 of FIG. 5B, the CPU 70 addresses via interface circuit 64 and address lines 109 an 8-bit addressable latch 110. The signal stored in the latch 110 is settable between values 0 and 255, in accordance with the signal on address lines 109. These settable values represent values between substantially 100 percent (corresponding to value 255) and zero per cent (corresponding to value zero) of the adjustable range to be applied to the multiplying D/A converter 113 via lines 112. The D/A converter 113 multiplies the input signal received on line 13 by the latched value, thereby providing fine gain adjustment of amplifier 126. The thusly adjusted output signal from the D/A converter on line 151 is amplified by amplifiers 125 and 126 and applied via resistor 149 to output line 51, where it is summed with the output signal from variable resistor 116 and resistor 118.

A multiplexer 111 is connected to both the address lines 109 and output lines 112 from latch 110 and is utilized for reading the values stored in latch 110 by the CPU 70. Data line 147 and enable lines 155, 156 are also coupled to CPU 70 via interface circuit 64.

The preferred method of calibrating the positive feedback signal by adjusting the gain of the variable gain circuit 50 to compensate for the spring force, as previously discussed, will be described now with respect to FIGS. 2, 5A, 5B and 6A to 6C. In the preferred embodiment the spring 57 has a sufficient length to assume linear deflection in both directions so that a substantial nonlinearity is not introduced into the servo. Consequently, in the preferred embodiment a fine calibration of the gain is obtained as an average value from a selected number of samples and is not adjusted for nonlinearity of movement. However, in other applications such adjustment for nonlinearity may be required and can be provided for example by utilizing a linearizing circuit as it is well known in the art.

With further reference to FIG. 5B, first a coarse calibration is provided by adjusting the variable resistor 116 as follows. The value on lines 112 which is applied to the multiplying D/A converter 113 is set to a median value, that is to a value equal to Mid=256/2=128, by the address signals applied via lines 109 from the CPU 70 of FIG. 2, as previously described. A selected positive value of the position request signal (+R) is applied by the CPU 70 via interface circuit 64, and lines 69 to the D/A converter 68 and thus to summing junction 12. The magnitude of the error signal E' at the output of the error signal amplifier 15 is measured, for example, by an oscilloscope. The variable resistor 116 is adjusted to obtain a minimum error signal value. The foregoing adjustment process is repeated for a negative value of the position request signal (−R) having a magnitude corresponding to the previously selected positive value but of opposite polarity and the resistor 116 is again adjusted to minimize the error signal. If the two adjustment values of the resistor 116 differ, the resistor is then adjusted to a value at mid-point between the previous adjustments.

Fine calibration of the positive feedback signal will be described now with reference to the flow charts depicted in FIGS. 6A to 6C. As it has been described above, in the preferred embodiment the purpose of the fine calibration process is to determine a multiplication factor value, further referred to as Kcf, which is applied to the multiplying D/A converter 113. The converter then multiplies the signal amplitude on line 13 by that value to obtain a desired accurate fine gain adjustment of the amplifier 125.

As is indicated by block 121 in the main flow chart (A) of FIG. 6A, the range of integer values for Kcf is set from a minimum value Lo=0, to a maximum value Hi=255, which range corresponds to the capacity of the previously described settable latch 110. Then the multiplexer 61 of FIG. 2 is set via control line 71 to apply the error voltage E' on line 16a to be determined by CPU 70, as indicated by block 122.

At block 123 the flow chart (A) branches off to flow chart (B) of FIG. 6B, which is used to detect a value Kcf corresponding to a minimum steady state position error E. Block 130 of flow chart (B) indicates that a median value Mid is calculated from the values Lo and Hi indicated in block 121 of FIG. 6A, as Mid=(Lo+Hi)/2. The value Kcf is calculated by the CPU 70 shown in FIG. 2 and applied to the D/A converter 113 of FIG. 5B. Block 132 indicates that an average error signal value E1 is calculated from a plurality of measurements corresponding to a selected positive value (+R) of the position request signal, as will be described later with reference to flow chart C. The calculated value is stored in block 132. Similarly, an average error signal value E2 is calculated from measurements corresponding to negative value (−R) of the position request signal, as shown by block 133. Preferably the values (+R) and (−R) are of the same magnitude and opposite sign. A flow chart (C) corresponding to the respective operations indicated by blocks 132, 133 is shown in FIG. 6C and will be described later. As is further indicated by block 134 in FIG. 6B, a difference between the average values E1, E2 stored by blocks 132, 133 is calculated, to obtain a difference error signal value F. Block 135 determines whether F is greater than or equal to zero. If it is, then the previously set value Hi is reset to be equal to the previously calculated value Mid, or Hi=Mid, by block 136. If the value F determined by block 135 is less than zero, block 137 resets the value Lo to Lo=Mid. Considering the new value Hi or Lo from block 136 or 137 on line 138, block 139 determines whether the difference (Hi-Lo) is less than two. If not, the above-described iteration process shown by flow chart (B) is repeated, starting from block 130, which calculates a new value Mid, utilizing the reset value Hi and Lo from block 136 or 137. When that above-indicated difference becomes less than two, that is, equal to one, the desired value Kcf has been found.

The flow chart (C) shown in FIG. 6C is an example of the average DC error value calculation for positive or negative values of the position request signal R, and will be described below.

The position request signal R is set by CPU 70 to a selected large positive value, for example to 80 per cent of its maximum positive value, as indicated by block 141. It is understood that the maximum positive value (+R) corresponds to maximum requested deflection of the spring mount 56 in a positive direction from its initial position. The initial position is assumed by the actuator when a zero position request signal is applied. Similarly, the maximum negative value of (−R) corresponds to a maximum desired deflection in a negative direction, opposite to the positive direction. The error signal E' corresponding to the set value (+R) is measured via line 16a by CPU 70 and the measured value is stored by the CPU as indicated by block 142. The foregoing process is repeated for a selected number of times for the same value of the signal R, for example 32 times, as indicated by block 143. The thusly obtained error signal values are then averaged as indicated by block 144 of flow chart (C). The signal R is then set to a negative value (−R) of a magnitude equal to the previously set positive value but of opposite polarity and the error signal E' is again measured as above described. The foregoing error signal measurements represent a peak-to-peak error. Because the measured error signal is of a very small magnitude, it contains a significant random noise component. The error signal averaging serves to eliminate the random noise from the measured error signal. It is seen from the foregoing description of the calibration process that when the error signal difference value F is positive, the calibration process takes place within the lower half of the adjustment range. When F is negative, the calibration takes place in the upper half of the range.

FIG. 7A depicts a position error characteristic ER1 obtained by measuring the error signal in response to a position request signal R1 applied in the form of a positive going sawtooth signal, in a known position servo circuit which does not compensate for the spring force. It is apparent from FIG. 7A that the error signal ER1 follows the shape of signal R1. That is, the position error is proportional to the amplitude of the position request signal R1.

FIG. 7B shows an improvement in substantially eliminating the position error from the position servo circuit of the preferred embodiment of the invention. The position error is now virtually zero in spite of the variations in the position request signal. This shows that the actual position is tracking the desired position much more accurately and that the calibrated positive feedback servo in accordance with the invention greatly improves servo performance.

What is claimed is:

1. A position servo system for positioning a member by means of a position actuator, said member being attached to a spring means, said spring means providing a force opposing a motion of said member from an initial position, comprising:
   sensor means for detecting an actual position of said member and providing a corresponding position feedback signal;
   summing means coupled to receive a position request signal and said position feedback signal, and to provide an error signal as a difference of said received signals;
   said position actuator coupled to receive said error signal and to apply a force necessary to overcome said force provided by said spring means and to move said member to a desired position;
   means coupled to apply a portion of said position feedback signal as a positive feedback signal to said position actuator to compensate for said force provided by said spring means; and
   programmable digital control means coupled to vary a magnitude of said positive feedback signal to obtain a substantially zero steady state error.

2. The system of claim 1 wherein said means for applying a portion of said position feedback signal comprises a feedback amplifier circuit having variable gain.

3. The system of claim 2 wherein said feedback amplifier circuit comprises an operational amplifier means having an input resistor and a feedback resistor.

4. The system of claim 3 wherein said means for calibrating comprises a control means coupled to vary at least one of an input resistor value and a feedback resistor value of said operational amplifier means.

5. The system of claim 2 wherein said means for applying a portion of said position feedback signal further comprises a variable resistor means coupled in parallel with said operational amplifier means.

6. The system of claim 2 wherein said means for applying a portion of said position feedback signal further comprises a variable resistor means coupled in series with said operational amplifier means.

7. The system of claim 3 further comprising a coarsely calibrated means and a finely calibrated means coupled in a path of said positive feedback signal.

8. The system of claim 7 wherein said coarsely calibrated means comprises a variable resistor means and said finely calibrated means comprises a variable gain operational amplifier means, having an input resistor and a feedback resistor.

9. The system of claim 8 further comprising a programmable digital control means and wherein said finely calibrated means further comprises a multiplying digital-to-analog converter coupled to receive a control signal from said control means, said digital-to-analog converter being coupled to change values of at least one of said input resistor and feedback resistor of said variable gain operational amplifier means.

10. The system of claim 7 wherein said coarsely calibrated means is coupled in parallel with said finely calibrated means.

11. The system of claim 7 wherein said coarsely calibrated means is coupled in series with said finely calibrated means.

12. A system for positioning a magnetic transducer in response to a position request signal, said transducer being mounted on a moveable mount attached to a spring means, said spring means providing a force opposing a motion of said transducer from an initial position, comprising:
   first means for detecting an actual position of said transducer and providing a corresponding position feedback signal;
   second means for receiving said position request signal and said position feedback signal and providing a difference of said signals to obtain an error signal;
   motor means coupled to apply a force necessary to overcome said force provided by said spring means and to move said transducer to a desired position;
   third means coupled to provide a portion of said position feedback signal as a positive feedback signal to compensate for said force provided by said spring means; and
   fourth means for receiving said error signal and said positive feedback signal, providing a sum of said signals and applying said sum as a drive signal to said motor.

13. The system of claim 12 further comprising a control means coupled to calibrate said positive feedback signal provided by said third means to obtain a substantially zero steady state error signal.

14. The system of claim 13 wherein said third means comprises means providing a coarsely calibrated positive feedback signal, coupled in parallel with means providing a finely calibrated positive feedback signal.

15. The system of claim 14 wherein said means providing said coarsely calibrated positive feedback signal comprises variable resistor means.

16. The system of claim 14 wherein said means providing said finely calibrated positive feedback signal comprises variable gain operational amplifier means.

17. The system of claim 16 wherein said control means comprises a programmable digital control means and wherein said means for providing said finely calibrated positive feedback signal comprises a multiplying digital-to-analog converter having presettable resistance values, said resistance values coupled to be preset in response to a control signal from said programmable control means to vary a gain of said operational amplifier means.

18. The system of claim 13 wherein said third means comprises means providing a coarsely calibrated positive feedback signal, coupled in series with means providing a finely calibrated positive feedback signal.

19. A position servo system for positioning a member by means of a position actuator, said member being attached to a spring means, said spring means providing a force opposing a motion of said member from an initial position, comprising:
   sensor means for detecting an actual position of said member and providing a corresponding position feedback signal;
   summing means coupled to receive a position request signal and said position feedback signal, and to provide an error signal as a difference of said received signals;
   said position actuator coupled to receive said error signal and to apply a force necessary to overcome said force provided by said spring means and to move said member to a desired position;
   means coupled to calibrate a portion of said position feedback signal and apply said calibrated signal as a positive feedback signal to said position actuator to compensate for said force provided by said spring means
   to obtain a substantially zero steady state error signal.

20. A system for positioning a magnetic transducer in response to a position request signal, said transducer being mounted on a moveable mount attached to a spring means, said spring means opposing a motion of said transducer from an initial position, comprising:
- first means for detecting an actual position of said transducer and providing a corresponding position feedback signal;
- second means for receiving said position request signal and said position feedback signal and providing a difference of said signals to obtain an error signal;
- motor means coupled to apply a force necessary to overcome said force provided by said spring means and to move said transducer to a desired position;
- third means coupled to provide a portion of said position feedback signal as a positive feedback signal path to said motor means to compensate for said force provided by said spring means, said third means having a variable gain;
- fourth means for receiving said error signal and said positive feedback signal, providing a sum of said signals and applying said sum as a drive signal to said motor; and
- programmable digital control means coupled to vary said variable gain of said positive feedback signal path to obtain a substantially zero steady state error.

21. A method of providing compensation for a force of a spring utilized in a position servo system for positioning a member, wherein said spring force opposes a motion of said member from an initial position, comprising the steps of:
- detecting an actual position of said member and providing a corresponding position feedback signal;
- receiving a position request signal and said position feedback signal, and providing an error signal as a difference of said signals;
- providing a force necessary to overcome said spring force, and to move said member to a desired position in response to said error signal;
- applying a portion of said position feedback signal as a positive feedback signal compensating for said spring force;
- calibrating said positive feedback signal to obtain a substantially zero steady state error signal by varying a magnitude of said positive feedback signal and detecting a positive feedback signal value corresponding to a minimum error signal value when a known position request signal is received by said system; and
- summing said calibrated positive feedback signal with said error signal.

22. The method of claim 21 wherein said calibration step comprises a coarse and a fine calibration of said positive feedback signal.

23. The method of claim 22 wherein said coarse calibration step comprises adjusting a value of a variable resistor coupled in a path of said positive feedback signal.

24. The method of claim 22 wherein said fine calibration step comprises adjusting the gain of an operational amplifier coupled in a path of said positive feedback signal.

25. The method of claim 23 wherein said coarse calibration step further comprises the steps of:
- applying a selected positive value of the position request signal;
- measuring a magnitude of a resulting error signal;
- adjusting said variable resistor to a first value which corresponds to a minimum error signal value;
- applying a selected negative value of the position request signal having a magnitude corresponding to that of said positive value;
- measuring a magnitude of a resulting error signal;
- adjusting said variable resistor to a second value which corresponds to a minimum error signal value; and
- adjusting said variable resistor to a mid-point between said first and second values.

26. The method of claim 24 wherein said fine calibration further comprises the steps of:
- selecting an adjustment range of said positive feedback signal extending from a selected minimum to a selected maximum integer adjustment value;
- calculating a median adjustment value from said minimum and maximum values;
- applying one of a selected positive and negative value of the position request signal a selected number of times;
- measuring and storing corresponding magnitudes of a resulting first error signal;
- calculating a first average error signal value from said stored first error signals;
- applying the other one of said selected positive and negative value of the position request signal a selected number of times;
- measuring and storing corresponding magnitudes of a resulting second error signal;
- calculating a second average error signal value from said stored second error signals;
- calculating a difference between said first and second average error signal values;
- resetting the maximum adjustment value to said calculated median adjustment value when said difference is a positive value and resetting the minimum adjustment value to said calculated median adjustment value when said difference is a negative value and calculating a subsequent median adjustment value from said minimum and maximum values, one of which corresponds to said reset value.

27. A method of providing compensation for a force of a spring utilized in a position servo system for positioning a member, wherein said spring force opposes a motion of said member from an initial position, comprising the steps of:
- detecting an actual position of said member and providing a corresponding position feedback signal;
- receiving a position request signal and said position feedback signal, and providing an error signal as a difference of said signals;
- providing a force necessary to overcome said spring force and to move said member to a desired position in response to said error signal; and
- calibrating a portion of said position feedback signal to compensate for said spring force and applying said calibrated signal as a positive feedback signal compensating for said spring force to obtain a substantially zero steady state error signal.

28. The method of claim 27 wherein said calibration step comprises varying a magnitude of said positive feedback signal and detecting a positive feedback signal value corresponding to a minimum error signal value when a selected position request signal is received by said system.

* * * * *